June 26, 1923.
I. C. VANCE
RELINER
Filed Feb. 7, 1922  2 Sheets-Sheet 1
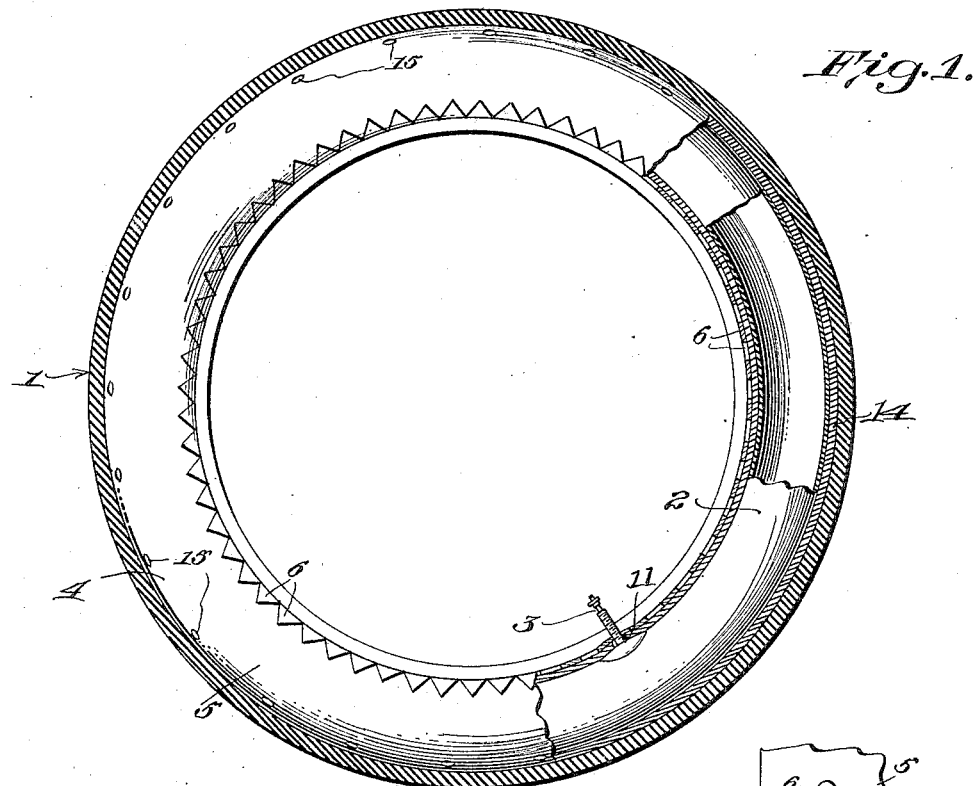
Fig.1.
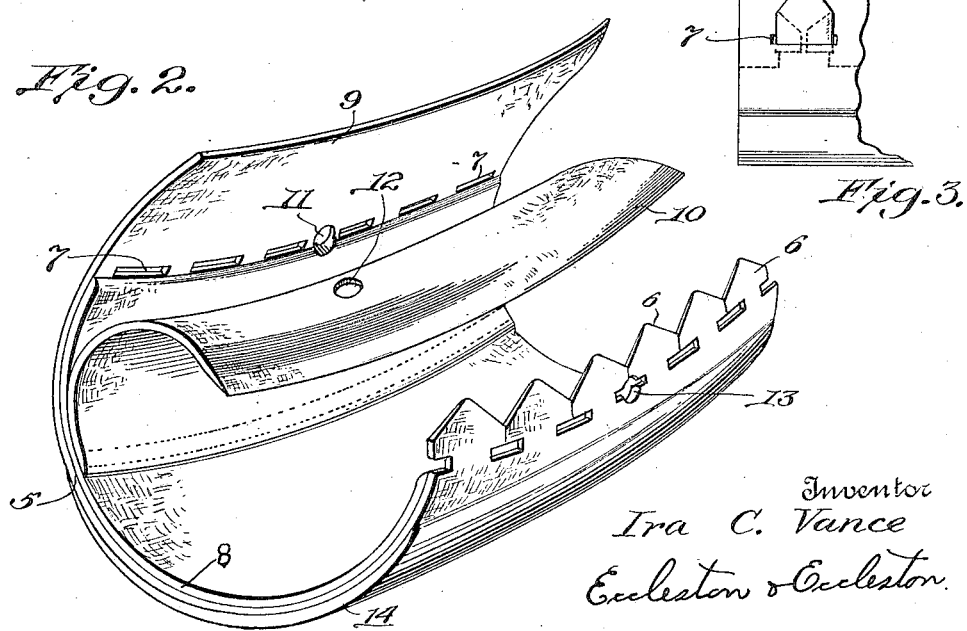
Fig.2.
Fig.3.
Inventor
Ira C. Vance
Eccleston & Eccleston
Attorneys June 26, 1923.

I. C. VANCE

RELINER

Filed Feb. 7, 1922

Inventor
Ira C. Vance
Eccleston & Eccleston
Attorneys

Patented June 26, 1923.

1,460,292

UNITED STATES PATENT OFFICE.

IRA CROW VANCE, OF HOWELL, ARKANSAS.

RELINER.

Application filed February 7, 1922. Serial No. 534,680.

*To all whom it may concern:*

Be it known that I, IRA CROW VANCE, a citizen of the United States, residing at Howell, in the county of Woodruff and State of Arkansas, have invented certain new and useful Improvements in Reliners, of which the following is a full, clear, and exact description thereof.

My invention relates to reliners for tire shoes or casings and has for its object to provide such a device which is simple and cheap to manufacture and one which may be easily applied to the inner tube and to the casing.

Another object of the invention is to provide such a reliner with means for preventing it from slipping with relation to the inner tube and other means to prevent it from slipping with respect to the outer casing.

Other objects and advantages of the invention will be apparent from the following description when taken in connection with the accompanying drawing, in which, Figure 1 is a sectional view of a tire with the inner tube and reliner in place, the tire and reliner being partly broken away to more clearly show the construction.

Figure 2 is a perspective view of a portion of the reliner.

Figure 3 is a fragmentary view showing one of the arrow-heads in process of insertion into one of the slots.

Figure 4 is a perspective view of a portion of an inner tube with my reliner in place thereon.

Figure 5 is a part section through a tire with the reliner also shown in section, and, Figure 6 is a section showing in detail the fabric used in forming the reliner.

Referring to the drawing more in detail, the numeral 1 designates the outer shoe or casing now in common use, while the numeral 2 indicates the usual inner tube provided with the valve stem 3. My reliner which is designated generally by the numeral 4 is composed of a number of layers of rubberized fabric vulcanized together to form a wrapper or support for the inner tube. The outer sheet 5 is composed of two layers of canvas vulcanized together and is formed at one edge with the locking devices or arrow-heads 6. At a short distance from its opposite edge the outer sheet 5 is formed with a line of slots 7 adapted to receive the arrow-heads 6. A second or inner sheet 8 composed of two layers of fabric is vulcanized to the outer sheet 5. The inner sheet 8 extends from the slots 7 to the base of the arrow-heads 6. A leaf 9 of double thickness extending from the line of slots 7 is thereby left free. Secured to the inner sheet 8 by a double row of stitching is a flap or leaf 10. This flap 10 is formed of two layers of fabric vulcanized together and has its free edge in registration with the free edge of the leaf 9. The leaves 9 and 10 are provided with the openings 11 and 12 while the edge of the wrapper is formed with the opening 13. The openings 11, 12 and 13 are for the purpose of receiving the valve stem of the inner tube when the reliner is put in place thereon.

A layer of rubber 14 is vulcanized onto the outer sheet 5 and is provided with a plurality of countersunk portions 15 which create partial vacuums and prevent creeping of the reliner with respect to the shoe or tire casing.

It should be here stated although I have shown and described a laminated canvas and rubber fabric as used in the construction of the reliner, other materials such as cord may be used if desired.

In operation, the inner tube being slightly inflated is encircled by the reliner, the edge carrying the arrow-heads 6 being inserted between the leaves 9 and 10. The arrow-heads are then inserted in the slots 7, the side projections of the arrow-heads being bent as shown in Figure 3 for that purpose. It will be understood of course that the valve 3 of the inner tube extends through the apertures 11, 12 and 13, thereby locking the reliner with respect to the inner tube, while the vacuum cups 15 prevent relative movement of the reliner and tire casing.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claims.

What I claim as new and desire to secure by Letters Patent is:

1. A reliner for tires including a wrapper formed of two superposed sheets secured together, the outer sheet being of greater area than the inner sheet and extending laterally beyond the edges thereof, whereby integral extensions of reduced thickness are formed, fastening means formed on each of said extensions, and a leaf attached to the wrapper and extending over the fastening means.

2. A reliner for tires including a wrapper formed of an outer sheet of double thickness, fastening devices extending from one edge of said sheet, said sheet being formed with perforations adjacent its opposite edge, a second sheet of double thickness secured to said first mentioned sheet and extending from the base of the fastening devices to the perforations, and a leaf secured to said last named sheet.

IRA CROW VANCE.